Patented June 6, 1950

2,510,872

UNITED STATES PATENT OFFICE 2,510,872

METHOD FOR REGENERATING ANTIMONY PENTAFLUORIDE FROM SPENT ANTIMONY HALIDES RESULTING FROM THE FLUORINATION OF ORGANIC CHLORIDES

Frederick B. Downing, Carney's Point, N. J., assignor to the United States of America as represented by the United States Atomic Energy Commission No Drawing. Application August 3, 1944, Serial No. 547,993

3 Claims. (Cl. 23—88)

This invention relates to the manufacture of fluorine compounds and is particularly concerned with the regeneration of antimony pentafluoride from spent antimony halides resulting from the fluorination of organic chlorides.

In the manufacture of organic fluorides from organic chlorides, it has long been the practice to employ as fluorinating agent a fluorochloride of pentavalent antimony. Fluorochlorides suitable for such purposes may be prepared by the action of chlorine on antimony trifluoride or by the action of hydrogen fluoride on antimony pentachloride. The latter reaction has been used to advantage in a continuous process involving the simultaneous introduction of hydrogen fluoride and organic chloride into a mixture of antimony fluorochlorides. By this procedure the antimony fluorochloride fluorinating agent is continuously regenerated so that, in effect, the process becomes a catalytic fluorination of organic chloride by means of hydrogen fluoride. It has been proposed to introduce elemental chlorine as well as hydrogen fluoride when substances which tend to reduce the pentavalent antimony to trivalent form are being treated. In general such processes, involving regeneration of fluorinating agent in situ, normally maintain a low fluorine content, about 20% or less of the total antimony fluorochlorides. Antimony pentafluoride is not formed.

The application of this type of process is limited to the treatment of organic chlorides having one or more relatively easily replaceable halogen atoms. In the treatment of organic polychlorides by such reagents fluorination normally ceases while a considerably proportion of the total chlorine content still remains in the organic nucleus. This is not objectionable when a compound containing a substantial proportion of chlorine is desired as the end product, but it prevents the preparation of fluorocarbons and certain of their derivatives of low or zero chlorine content by this type of process. For example, a chlorinated heptane consisting essentially of dodecachloroheptanes may be reacted with hydrogen fluoride in the presence of fluorochlorides of pentavalent antimony of low fluorine content to produce a fluorination product fluorinated to a degree corresponding to the average molecular formula $C_7H_4Cl_8F_6$. Attempts to further fluorinate this product by the same reaction cause little or no further fluorination.

More recently it has been discovered that by employing antimony pentafluoride as a fluorinating agent, it is possible to remove practically all of the chlorine from organic polychlorides. Thus, by employing a sufficient quantity of this reagent, the above mentioned fluorinated dodecachloroheptane product of the average formula $C_7H_4Cl_8F_6$ may be further fluorinated to form a fluorination product which has an average chlorine content of one chlorine atom per molecule and which contains a very substantial proportion of a fluorinated compound containing no chlorine.

The reaction of antimony pentafluoride with organic chlorides involves an interchange of fluorine for chlorine with the formation of antimony fluorochlorides. In order to effect fluorinations economically by means of antimony pentafluoride, it is necessary that the antimony fluorochloride by-products be reconverted to an antimony pentafluoride product of sufficient purity for reuse either alone or mixed with additional antimony pentafluoride.

It is an object of the present invention to provide a process for the economical regeneration of spent antimony pentafluoride fluorinating agents. A further object is the conversion of antimony fluorochloride by-products of organic fluorinations to antimony pentafluoride products of sufficient quality for use as fluorinating agents to effect the same high degree of fluorination as obtainable by use of the pure virgin material. Further objects of the invention will appear from the following general description and specific illustrations.

In accordance with the present invention, antimony salts obtained by separating organic compounds from the reaction product obtained by the treatment of organic chlorides with fluorides of pentavalent antimony are treated with elemental chlorine, and the chlorination product is reacted with hydrogen fluoride.

The spent antimony salts contain substantial quantities of trivalent antimony salts, which are converted by the chlorine treatment of salts of pentavalent antimony. By the hydrogen fluoride treatment, a substantial part of the chlorinated product is converted to antimony pentafluoride; and this may be separated from unconverted antimony fluorochlorides by distillation or may be used directly as a fluorinating agent.

The antimony pentafluoride thus obtained has a sufficient concentration so that it may be used directly for the production of highly fluorinated organic compounds in which all or substantially all of the chlorine present in the chlorinated hydrocarbon starting material has been replaced by fluorine.

The separation or organic compounds from antimony fluorochlorides may be effected by decantation or by fractional distillation or by a combination of the two.

The chlorination step may be carried out at normal room temperature or at elevated temperatures and at atmospheric or elevated pressures. Preferably, the chlorination is conducted at about atmospheric pressure and at temperatures between 15° and 70° C.

The hydrogen fluoride treatment may be conducted at atmospheric pressure or at elevated or reduced pressures and at room temperature or higher or lower temperatures. Preferably temperatures between about 30° C. and about 100° C. are employed at atmospheric pressure.

The reaction of hydrogen fluoride becomes slower as the fluorine content of the antimony salts increases. Consequently, it is advantageous in many cases to treat the antimony salts with a quantity of hydrogen fluoride substantially less than required for complete conversion of antimony fluorochlorides to pentafluoride and then to distill off the antimony pentafluoride from the chlorine-containing salts. The distillation residue may be treated with an additional quantity of hydrogen fluoride either alone or in admixture with used antimony salts from a subsequent fluorination operation.

The conversion of trivalent antimony salts to pentavalent antimony salts by the introduction of chlorine is similar in this respect, and the chlorination likewise may be limited to effect only a partial conversion of the trivalent antimony to pentavalent form. By successive treatments alternately with chlorine and with hydrogen fluoride, the entire antimony content of the used antimony salts is ultimately converted to antimony pentafluoride.

The antimony fluorochlorides tend to reduce the vapor pressure of antimony pentafluoride and render complete separation of the antimony pentafluoride by fractional distillation difficult. Thus in a product containing fluorine and chlorine in proportions such that about 60% of the antimony was present as $SbClF_4$ and about 40% as $SbF_5$, no antimony pentafluoride was distilled off at temperatures below 167° C. although the normal boiling point of this material is about 150° C. Consequently, it is expedient in many cases to distill off only a part of the antimony pentafluoride and to return the remainder to the chlorination or fluorination step for treatment of residual fluorochlorides.

It will be apparent from what has been said that the chlorination and hydrogen fluoride treatment should be conducted to a point at which most of the fluorochlorides have vanished in order to facilitate the distillation, and further, the distillation should remove as much antimony pentafluoride as reasonably possible since its presence in a succeeding hydrogen fluoride treatment will retard the conversion of fluorochlorides to pentafluoride.

The distillation of antimony pentafluoride from fluorochlorides may be conducted at normal atmospheric pressure or elevated or reduced pressures. It may be conducted with or without the aid of an inert distillation medium such as a selective solvent for the chlorine-containing antimony salts.

In conducting the process of the invention, it is highly important that the presence of materials of the group iron, nickel, cobalt and copper be avoided since they react with the antimony salts and prevent the production of antimony pentafluoride. In order to avoid the presence of such materials, it is desirable that the process be conducted throughout the entire cycle of fluorination and regeneration in an apparatus free from metals with the atomic numbers 26 to 29 inclusive. Aluminum may be used for carrying out all steps of the process. Glass equipment may be used for the step of fluorinating organic compounds. It should be appreciated, of course, that in using glass equipment, considerable attack upon the glass may be expected. Other materials of construction such as magnesium may be employed without deleteriously affecting the formation of the antimony pentafluoride reagent.

In the following example quantities are expressed as parts by weight:

*Example*

An antimony fluorochloride distillation residue, obtained by distilling in an aluminum still, the organic fluorination product from a reaction mixture obtained by heating in an aluminum-lined autoclave at about 150° C. antimony pentafluoride and an organic polychloride of the average molecular formula $C_7HCl_{11}$ was found to comprise 49% antimony, 9% chlorine, 30% fluorine and 12% organic halides.

765 parts of this material was placed in an aluminum pot provided with an aluminum agitator and a vent leading through an aluminum reflux condenser to an absorber for acid. The agitator was started and chlorine was introduced slowly at room temperature (19° C.) until 45 parts of chlorine had been admitted. Nitrogen was then bubbled through the mixture to expel excess chlorine.

The chlorinated mixture was heated to 40° C. and anhydrous hydrogen fluoride was introduced slowly until at the end of 4 hours 200 parts had been introduced. During this period the aluminum pot was maintained at about 40° C. and the reflux condenser was maintained at —45° C.

The mixture was agitated for an additional 22 hours and the temperature was raised gradually to 52° C. During the last 2½ hours nitrogen was bubbled through the mixture. At the end of this period the rate of hydrogen chloride evolution had fallen to 0.5 parts per hour. To expel excess hydrogen fluoride the mixture was then heated gradually to 140° C. without refluxing.

403 parts of the mixture was cooled to 50° C., introduced into an aluminum still and fractionally distilled at ordinary atmospheric pressure to a final distillation temperature of 155° C. yielding 282 parts of antimony pentafluoride containing less than 1% chlorine. This distillate was employed for the fluorination of an organic polychloride and was found to give results equal to those obtained with distilled virgin $SbF_5$.

It will be understood that I intend to include variations and modifications of the invention and that the preceding example is an illustration only and in no wise to be construed as a limitation upon the invention, the scope of which is defined in the appended claims, wherein I claim:

1. The method of producing antimony pentafluoride, suitable for use as a fluorinating agent to produce highly fluorinated organic compounds from organic chlorine compounds, from antimony fluorochlorides obtained by distilling off organic fluorination products from antimony fluorochloride by-products, which comprises reacting the antimony fluorochloride mixture with elemental chlorine at a temperature between about 15° C. and about 70° C. until substantially no further reaction of chlorine is obtained, introducing hydrogen fluoride into the reaction product at a temperature between 30° and 100° C., and fractionally distilling antimony pentafluoride from the resulting reaction mixture, said reaction and distillation being conducted in aluminum vessels.

2. The cyclic process for fluorinating a chlorinated organic compound to produce fluorination products of low chlorine content, which comprises reacting a chlorinated organic compound with antimony pentafluoride, separating antimony fluorochlorides from the reaction product, reacting the antimony fluorochlorides successively with elemental chlorine and with anhydrous hydrogen fluoride, distilling off from the resulting reaction product an antimony pentafluoride fraction boiling between 145° and 155° C., and reacting this fraction with additional chlorinated organic compound, all of the steps of said process being conducted in aluminum vessels.

3. The method of producing antimony pentafluoride, suitable for use as a fluorinating agent to produce highly fluorinated organic compounds from organic chlorine compounds, from antimony fluorochlorides obtained by distilling off organic fluorination products from antimony fluorochloride by-products, which comprises reacting the antimony fluorochloride mixture with elemental chlorine at a temperature between about 15° C. and about 70° C. until substantially no further reaction of chlorine is obtained, introducing hydrogen fluoride into the reaction product at a temperature between 30° and 100° C., and distilling off from the resulting reaction product an antimony pentafluoride fraction, normally boiling between 145° and 155° C., said reaction and distillation being conducted in aluminum vessels.

FREDERICK B. DOWNING.

REFERENCES CITED

The following references are of record in the file of this patent:

UNITED STATES PATENTS

| Number | Name | Date |
|---|---|---|
| 1,582,328 | Adamson et al. | Apr. 27, 1926 |
| 1,934,943 | McNary | Nov. 14, 1933 |
| 1,939,162 | Caro et al. | Dec. 12, 1933 |
| 1,984,480 | Henne | Dec. 18, 1934 |
| 2,005,710 | Daudt et al. | June 18, 1935 |
| 2,024,008 | Midgley et al. | Dec. 10, 1935 |
| 2,102,737 | Peck et al. | Dec. 21, 1937 |
| 2,146,354 | Scherer | Feb. 7, 1939 |
| 2,410,358 | Perkins et al. | Oct. 29, 1946 |

OTHER REFERENCES

Mellor, "Comprehensive Treatise on Inorganic and Theoretical Chemistry," vol. 9, p. 467 (1929).

Ruff—Ber. der Deu. Chem., vol. 39, pp. 4310–11, (1906).